(12) United States Patent
Takabayashi

(10) Patent No.: US 8,124,671 B2
(45) Date of Patent: Feb. 28, 2012

(54) ACTIVE RAY-CURABLE INK AND METHOD FOR FORMING IMAGE

(75) Inventor: Toshiyuki Takabayashi, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 230 days.

(21) Appl. No.: 12/515,786

(22) PCT Filed: Oct. 30, 2007

(86) PCT No.: PCT/JP2007/071099

§ 371 (c)(1),
(2), (4) Date: May 21, 2009

(87) PCT Pub. No.: WO2008/065840

PCT Pub. Date: Jun. 5, 2008

(65) Prior Publication Data

US 2010/0015336 A1    Jan. 21, 2010

(30) Foreign Application Priority Data

Nov. 28, 2006  (JP) .................................. 2006-319885

(51) Int. Cl.
*C09D 11/00*  (2006.01)

(52) U.S. Cl. ........ 523/160; 523/161; 347/100; 347/102; 430/495.1

(58) Field of Classification Search .................. 523/160, 523/161
See application file for complete search history.

(56) References Cited

U.S. PATENT DOCUMENTS

| 2005/0113477 A1* | 5/2005 | Oxman et al. ................. 522/6 |
| 2006/0023043 A1* | 2/2006 | Ishibashi et al. .............. 347/100 |
| 2006/0142409 A1* | 6/2006 | Sasa .............................. 522/167 |
| 2006/0189712 A1* | 8/2006 | Kondo ........................... 523/160 |
| 2008/0018725 A1* | 1/2008 | Mogi et al. .................... 347/102 |

FOREIGN PATENT DOCUMENTS

| EP | 1-621-593 | 2/2006 |
| EP | 1-688-468 | 8/2006 |
| EP | 1-702-962 | 9/2006 |
| JP | 2002188025 | 7/2002 |
| JP | 2004091556 | 3/2004 |
| JP | 2005113043 | 4/2005 |
| JP | 2006037021 | 2/2006 |
| JP | 2006183014 | 7/2006 |
| JP | 2006241435 | 9/2006 |

OTHER PUBLICATIONS

Supplemental European Search Report EP 07-83-0833 dated Mar. 3, 2011 (4 pages).

\* cited by examiner

*Primary Examiner* — Doris Lee
(74) *Attorney, Agent, or Firm* — Lucas & Mercanti, LLP

(57) ABSTRACT

An active ray-curable ink comprising a pigment, a photoinitiator, a polymerizable compound, a compound represented by following Formula (1), and a urethane polymer or a urethane oligomer having no photopolymerizable group in a molecule:

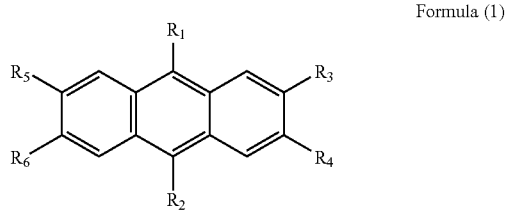

Formula (1)

wherein at least either of $R_1$ and $R_2$ represents an alkoxy group having a carbon number of 4-10; and at least one of $R_3$, $R_4$, $R_5$, and $R_6$ represents an alkyl group, an alkylsulfonyl group, or an alkoxy group having a carbon number of 4-9, and has a secondary or tertiary carbon atom at a binding site to the anthracene ring.

8 Claims, 2 Drawing Sheets

ACTIVE RAY-CURABLE INK AND METHOD FOR FORMING IMAGE

This is a U.S. National Phase Application under 35 U.S.C. 371 of International Application PCT/JP2007/071099 filed on Oct. 30, 2007, which claims the priority of Japanese Application No. 2006-319885, filed Nov. 28, 2006, the entire content of both Applications are hereby incorporated by reference.

TECHNICAL FIELD

The present invention relates to an active ray-curable ink and a method for forming an image utilizing the same.

More specifically, the present invention relates to an active ray-curable ink enabling to form a cured film exhibiting excellent flexibility and adhesion to a recording medium without impairing feel of quality of a printed matter; and a method for forming an image utilizing the same.

BACKGROUND

Conventionally, active ray-curable compositions, which are cured with active energy radiation such as UV radiation or electron beams, have been put into practice use in a wide variety of end use applications such as paints, adhesives, printing inks, printed circuit boards, and electrically insulating materials for plastics, paper, woodworks, and inorganic materials. Over recent years, in methods for forming an image utilizing active ray-curable ink, further enhanced adhesion to a recording medium and flexibility improvement of a cured film after curing have been demanded.

Especially in cases when image formation is carried out on a fibrous material such as a textile using active ray-curable ink, there have been noted such significant problems that feel of quality of the textile is impaired due to insufficient flexibility of a cured film, and crumpling of the image-formed textile results in peeling of the cured film.

On the other hand, for an ink-jet recording system utilizing a polymerizable composition, there is UV curable ink-jet ink which is cured with UV radiation. An ink-jet system utilizing this UV curable ink-jet ink is receiving much attention due to quick-drying properties and superior recordability to recording media with no ink absorbability. Accordingly, various types of UV curable ink-jet inks have been developed (for example, please refer to Patent Documents 1 and 2).

However, it is disadvantageous that since a formed cured film exhibits poor flexibility, the cured film tends to crack due to no conformity to a recording medium. Therefore, there has been produced the problem that printing can be performed on only limited types of recording media.

In contract, disclosed is a method wherein a plasticizer is added to an ink-jet ink for ink-jet printing to provide plasticity (for example, please refer to Patent Document 3).

However, the method described in Patent Document 3 relates to a melt-type ink-jet ink, and no UV curable ink-jet ink is described at all.

Further, mere addition of a plasticizer produces the problems that insufficient curability is expressed and a cured film (printed matter) is vulnerable to damage.

Still further, when a UV curable ink-jet ink containing a pigment, a photoinitiator, and a polymerizable compound is used, it is disadvantageous that ejection tends to be unstable depending on the operational ambience. Especially when a flexibility enhancer such as a plasticizer is added as described above, such characteristics are markedly exhibited.

On the other hand, there is noted such a problem that an ink employing a cationically polymerizable compound is sensitive to moisture (humidity) of a molecular level (for example, please refer to Patent Documents 4-7).

As described in Patent Documents 4-7, there is widely known a technology wherein a polycyclic aromatic compound, having, as substituents, a hydroxyl group and at least one of an aralkyloxy group and an alkoxy group which may be substituted, is used as a sensitizer to enhance curability.

However, when a polycyclic aromatic compound is used, there has been noted such a problem that precipitation of the above-described photoinitiator and dispersant is induced, whereby ejection stability after cooled storage and/or after high temperature storage is further deteriorated.

Patent Document 1: Unexamined Japanese Patent Application Publication No. (hereinafter referred to as JP-A) 6-200204
Patent Document 2: Japanese Translation of PCT International Application Publication No. 2000-504778
Patent Document 3: JP-A 8-3493
Patent Document 4: JP-A 2002-188025
Patent Document 5: JP-A 2002-317139
Patent Document 6: JP-A 2005-113043
Patent Document 7: JP-A 2006-37021

DISCLOSURE OF THE INVENTION

Problems to be Solved by the Invention

In view of the above problems, the present invention was completed. An object of the present invention is to provide an active ray-curable ink enabling to form a cured film exhibiting excellent color mixing resistance, film hardness, adhesion resistance, and flexibility regardless of storage temperature and storage period; and a method for forming an image utilizing the same.

Means to Solve the Problems

The above object of the present invention was achieved by the following constitution:

Item 1. An active ray-curable ink comprising a pigment, a photoinitiator, a polymerizable compound, a compound represented by following Formula (1), and a urethane polymer or a urethane oligomer having no photopolymerizable group in a molecule:

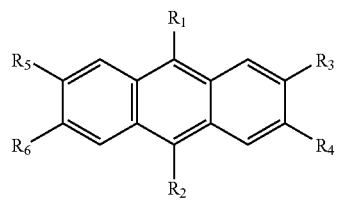

Formula (1)

In the formula, at least either of $R_1$ and $R_2$ represents an alkoxy group having a carbon number of 4-10; and at least one of $R_3$, $R_4$, $R_5$, and $R_6$ represents an alkyl group, an alkylsulfonyl group, or an alkoxy group having a carbon number of 4-9, and has a secondary or tertiary carbon atom at a binding site to the anthracene ring.

Item 2. The active ray-curable ink described in Item 1 above, wherein a weight average molecular weight of the urethane polymer or the urethane oligomer is 600-10000.

Item 3. The active ray-curable ink described in Item 1 or 2 above containing the urethane polymer or the urethane oligomer at a ratio of 1.0%-20% by mass based on the total weight of the ink.

Item 4. The active ray-curable ink described in any one of Items 1-3 above containing a monofunctional monomer as the polymerizable compound at a ratio of 10%-30% by mass based on the total weight of the ink.

Item 5. The active ray-curable ink described in Item 4 above, wherein the monofunctional monomer is at least one type of compound selected from an epoxy compound, a vinyl ether compound, and an oxetane compound.

Item 6. The active ray-curable ink described in any one of Items 1-5 above containing a modified silicone oil.

Item 7. The active ray-curable ink described in any one of items 1-6 above having a viscosity of 7-100 mPa·s at 25° C.

Item 8. A method for forming an image comprising the step of: ejecting an active ray-curable ink described in any one of items 1-7 above onto a recording medium from an ink-jet recording head, wherein the recording medium is a fibrous material.

The present inventor found that when a compound represented by above Formula (1) and a urethane polymer or a urethane oligomer having no photopolymerizable group in the molecule were contained in an active ray-curable ink together with a pigment, a photoinitiator, and a polymerizable compound, flexibility and substrate adhesion, having been conventionally problematic, were improved and also an ink having no problem with photo-curability was realized.

Further, it was also found that via this constitution, an ink-jet system exhibited exceptional ejection stability over a long period of time.

Effects of the Invention

The present invention made it possible to provide an active ray-curable ink enabling to form a cured film exhibiting excellent color mixing resistance, film hardness, adhesion resistance, and flexibility regardless of storage temperature and storage period; and a method for forming an image utilizing the same.

DESCRIPTION OF THE ALPHANUMERIC DESIGNATIONS

Figure 1:
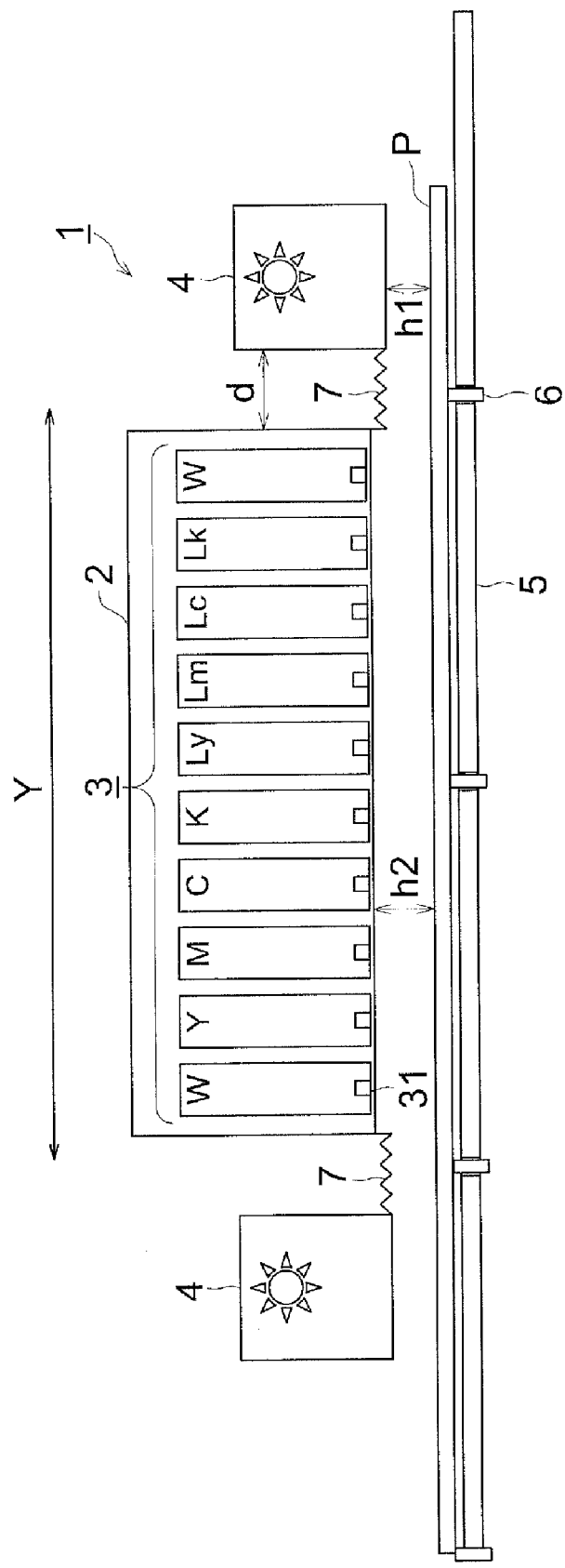
FIG. 1 A front view showing one example of a main section constitution of an ink-jet recording apparatus used in the present invention FIG. 2 A top view showing another example of a main section constitution of an ink-jet recording apparatus used in the present invention

1: recording apparatus
2: head carriage
3: recording head
31: ink ejection orifice
4: irradiation member
5: platen section
6: guide member
7: bellows structure
8: irradiation source
P: recording medium

DESCRIPTION OF THE PREFERRED EMBODIMENT

The present invention will now be detailed.

The active ray-curable ink (hereinafter also referred to simply as the ink) of the present invention is characterized by containing a compound represented by above Formula (1).

Conventionally, when a sulfonium salt is used as a photoinitiator, it is widely known that anthracene derivatives such as 9,10-diethoxyanthracene, 9,10-dibutoxyanthracene, or 2-ethyl-9,10-dimethoxyanthracene are used as a sensitizer to enhance curability. However, when any of these anthracene derivatives is merely used, there has been noted the problem that a photoinitiator or such an anthracene derivative itself tends to be precipitated at low temperature, whereby the clogging of the nozzle of an ink-jet recording head occurs, resulting in unstable ejection.

Especially in order to enhance flexibility of a cured film, when a urethane polymer or a urethane oligomer is used or a monofunctional monomer is contained as a polymerizable compound at a ratio of 10-30%, the above precipitation problem becomes pronounced.

Further, since these anthracene compounds available on the market have a problem with safety, there has been difficulty in using an ink containing any thereof for food packaging printing.

Still further, to enhance repellency of the nozzle surface of an ink-jet recording head and then realize stable ejection performance, it is known that it is effective to use a modified silicone oil, specifically an alkyl-modified silicone oil. However, it has become obvious that combined use of the modified silicone oil produces a more major problem of precipitation of at least either of an initiator and an anthracene derivative as described above.

Therefore, the present inventor found that when a urethane polymer or a urethane oligomer was used together with a compound represented by Formula (1), the targeted object of the present invention was achieved. Further, it was found that even when a monofunctional monomer was allowed to be contained as a polymerizable compound at a ratio of 10-30% and also a modified silicone was employed, stable ejection performance after cooled storage and/or after high temperature storage was realized with curability enhancement maintained.

Further, the above constitution made it possible to remarkably improve stability with respect to an ink.

Next, the compound represented by above Formula (1) is detailed below.

In Formula (1), at least either of $R_1$ and $R_2$ represents an alkoxy group having a carbon number of 4-10. When the carbon number is at least 4, ejection stability after storage can be realized. And when the carbon number is at most 10, sufficient curability enhancement can be realized. From the viewpoint of ejection stability, an alkoxy group having a carbon number of 4-8 is more preferable.

At least one of $R_3$-$R_6$ represents an alkyl group, an alkylsulfonyl group, or an alkoxy group having a carbon number of 4-9, and has a secondary or tertiary carbon atom at a binding site to the anthracene ring. This structure makes it possible to remarkably enhance ejection stability after frozen storage of at most −10° C. and after high temperature storage of at least 50° C. When the carbon number is at least 4, the above effect can adequately be expressed. In the case of at most 9, adequate curability can be realized. An alkyl group having a carbon number of 4-5 is more preferable.

Specific examples of the compound represented by Formula (1) of the present invention will now be listed that by no means limit the scope of the present invention.

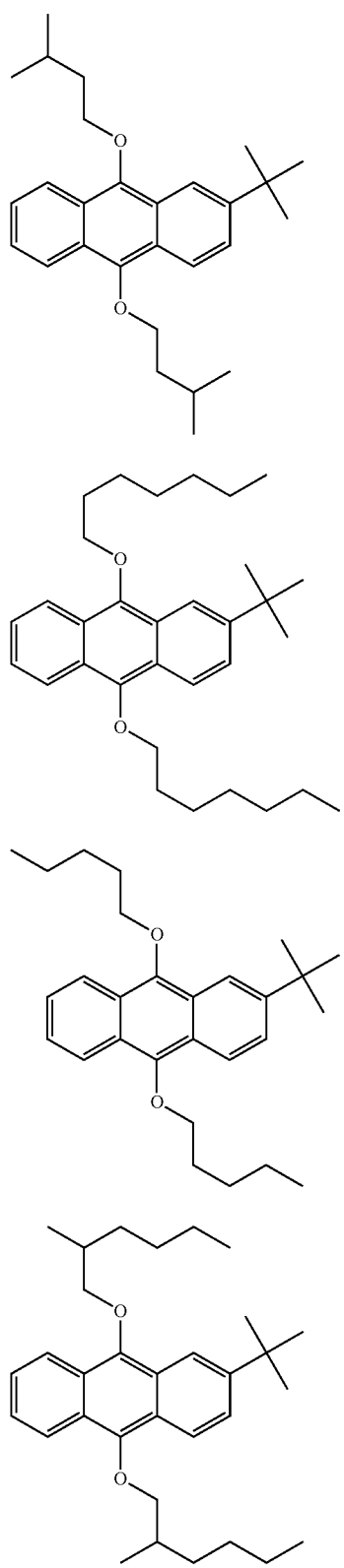
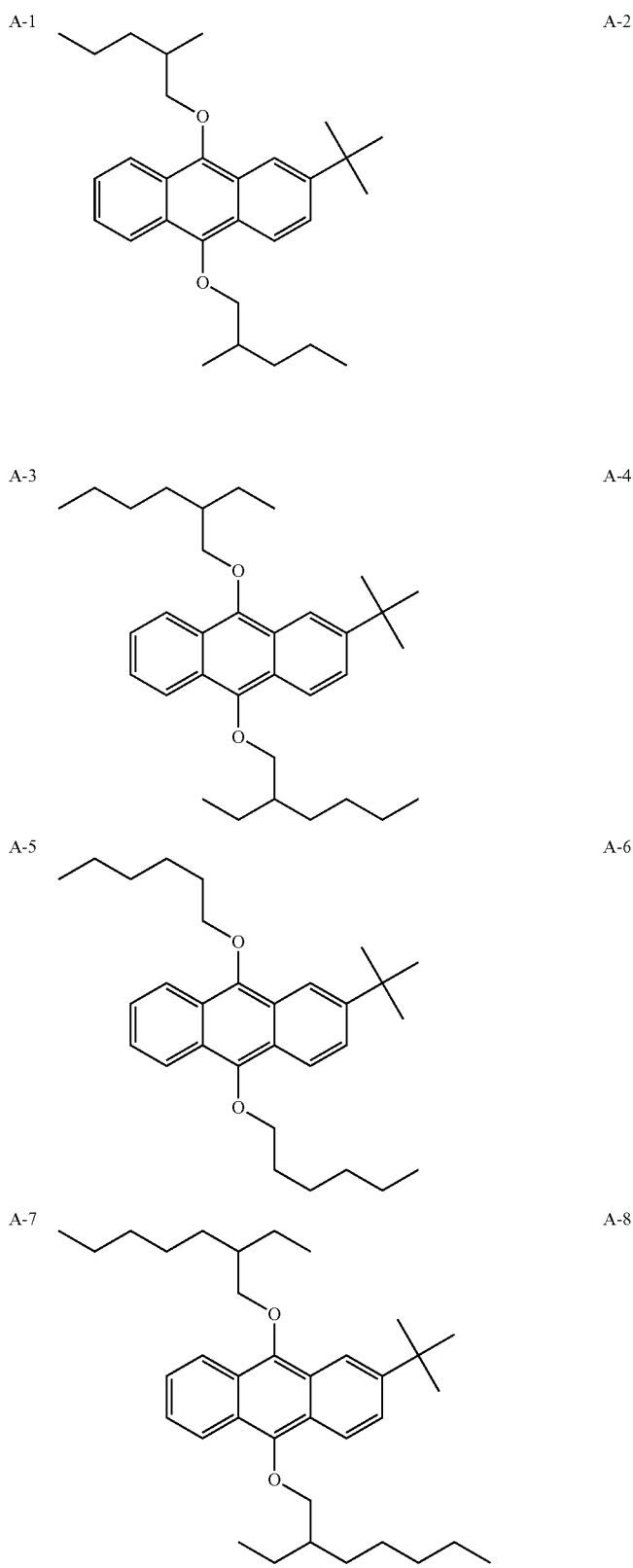
A-1 A-2
A-3 A-4
A-5 A-6
A-7 A-8

-continued
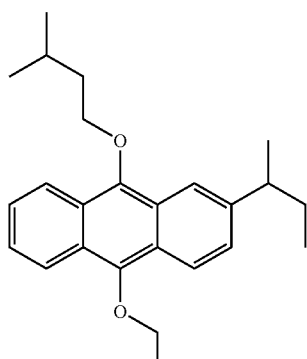
A-9
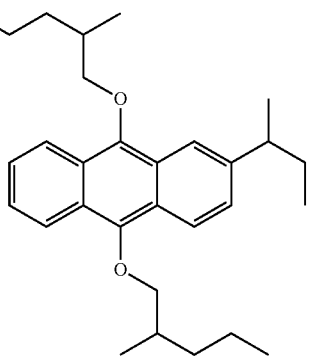
A-10
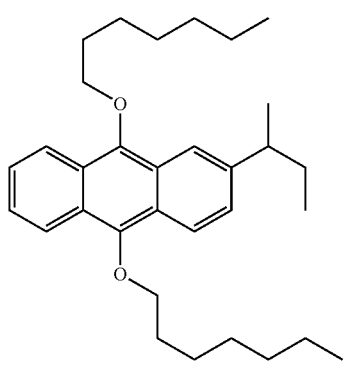
A-11
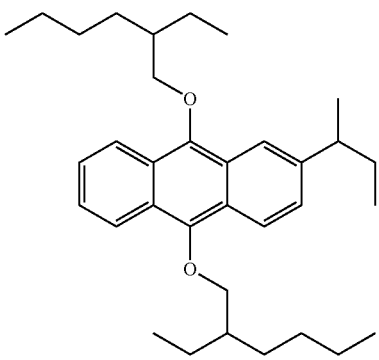
A-12
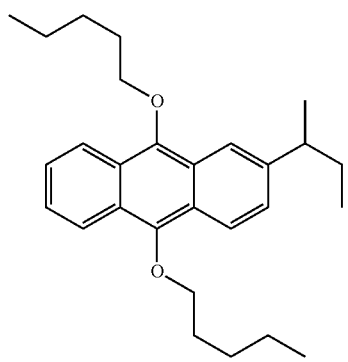
A-13
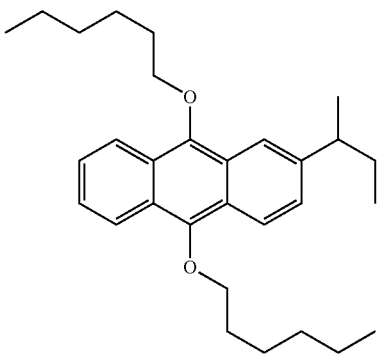
A-14
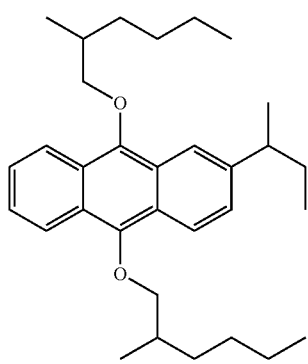
A-15
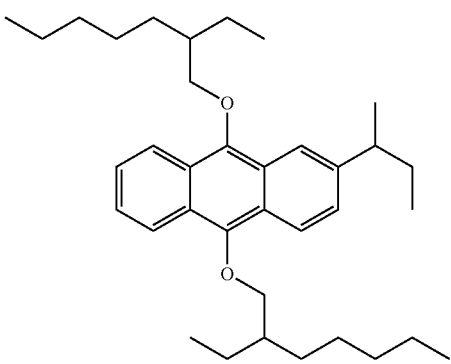
A-16

-continued
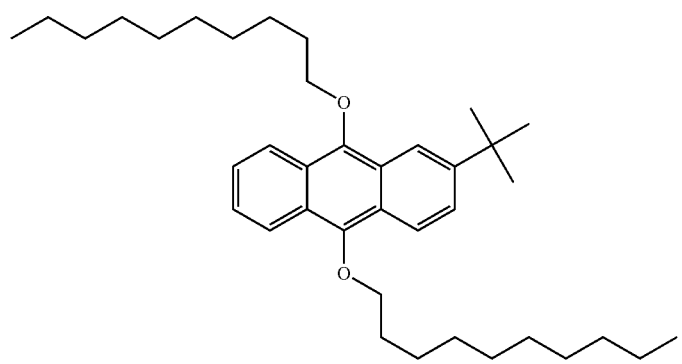
A-17
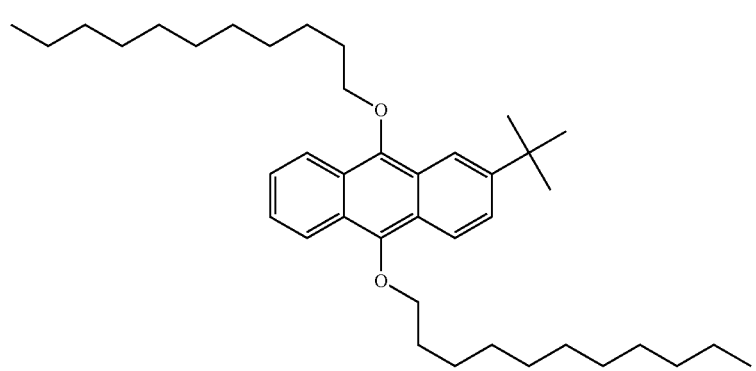
A-18
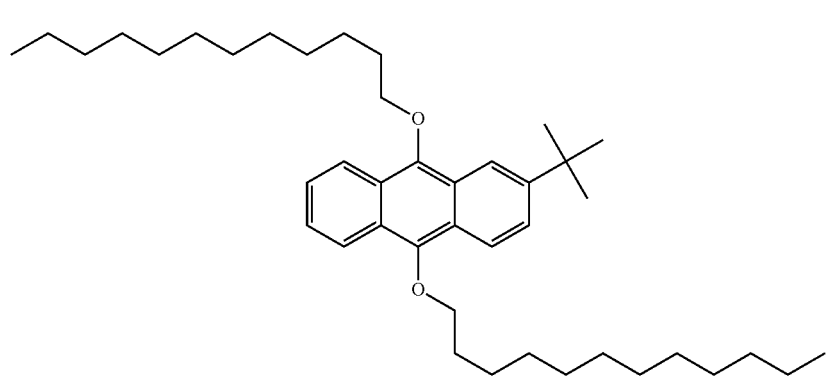
A-19
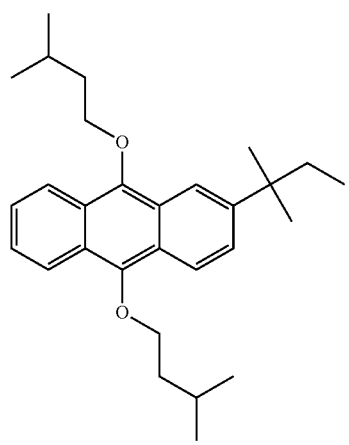
A-20
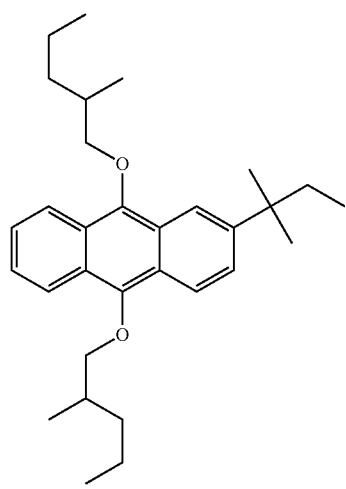
A-21

-continued
A-22
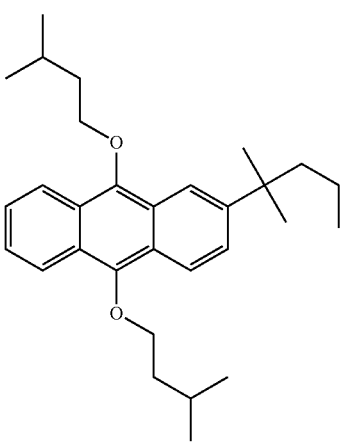
A-23
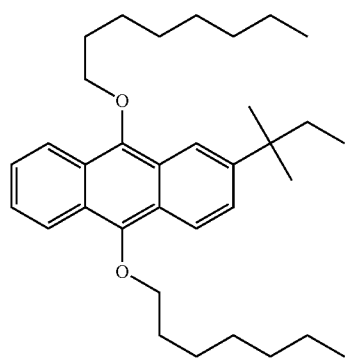
A-24
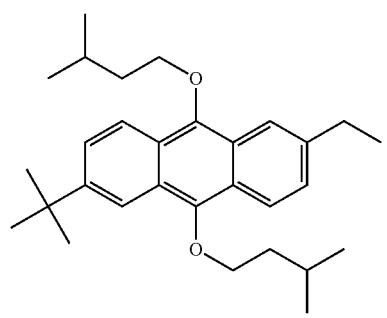
A-25
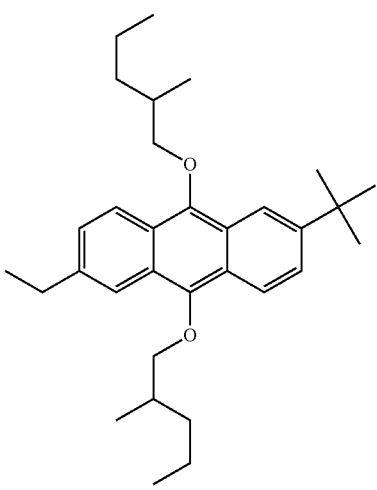
A-26
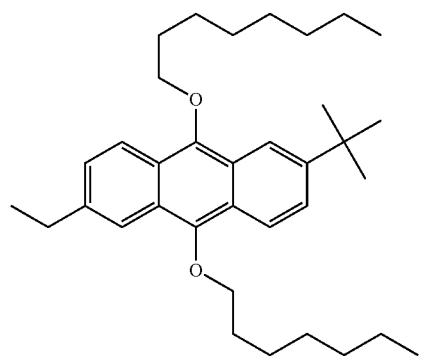
A-27
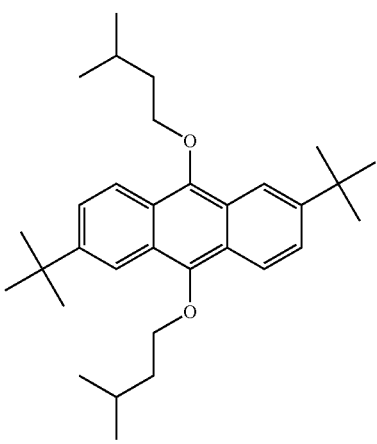
A-28
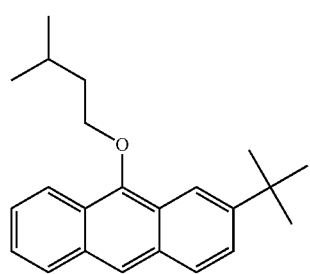
A-29
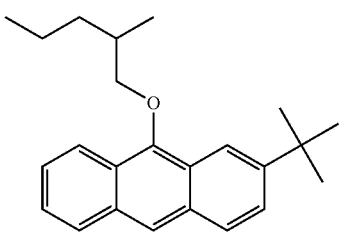

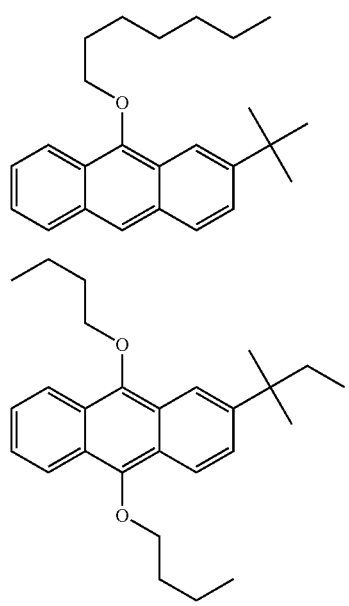

The compound represented by Formula (1) can easily be synthesized with reference to known information including, for example, JP-A Nos. 2005-54158, 2003-2855, 2001-253842, 2002-20337, and 2002-37751.

Further, the amount of the compound represented by Formula (1) is preferably 0.1-5.0% by mass based on the total amount of an active ray-curable ink. From the viewpoint of ejection stability enhancement after frozen storage of at most −10° C. for at least 2 weeks and after high temperature storage of at least 50° C. for at least 2 weeks, a ratio of 0.5-3.0% by mass is more preferable.

The active ray-curable ink of the present invention is characterized by containing a urethane polymer or a urethane oligomer having no photopolymerizable group in the molecule, together with a compound represented by Formula (1) according to the present invention.

The photopolymerizable group referred to in the present invention refers to an acryloyl group contained in a polymerizable monomer as typified by an acrylate and vinyl ether; a radically polymerizable group such as a vinyl group; and a cationically polymerizable group as typified by an oxirane group and an oxetane group.

Conventionally, as a urethane polymer of a weight average molecular weight of less than 10000, those prepared via introduction of (or via modification using) a radically polymerizable group or a cationically polymerizable group have been commonly used.

Therefore, it is not preferable to incorporate a photopolymerizable group in a urethane polymer or oligomer according to the present invention, since such problems as an increase in ink viscosity and deterioration of curability after storage are produced.

The weight average molecular weight of the urethane oligomer or oligomer of the present invention is preferably 600-10000. When the molecular weight falls within this range, excellent adhesion to a substrate and flexibility of a cured film can be realized without impairing reactivity of a polymerizable compound.

Herein, the weight average molecular weight is a value determined via GPC (gel permeation chromatography).

When the weight average molecular weight is at least 600, adding effects can sufficiently be produced. When the weight average molecular weight is at most 10000, impairing of reactivity of a polymerizable compound can be prevented. Further, in the present invention, a urethane polymer or oligomer of a weight average molecular weight of 1000-4000 is more preferably used. Especially when the active ray-curable ink of the present invention is used as an active ray-curable ink-jet ink, this range is preferable.

The content in the active ray-curable ink is preferably 1-20% by mass, more preferably 5-15% by mass. In the case of at least 1% by mass, sufficient effects can be exhibited. In the case of at most 20% by mass, sufficient scratch resistance and curability of a cured film can be realized.

In the present invention, to improve the flexibility matter of a cured film, a monofunctional monomer is preferably used as a polymerizable compound in the range of 10-30% by mass. However, when a polymerizable compound is used alone in the above range, there have been such problems that insufficient curability can be realized, whereby a cured film formed tends to be sensitive to scratches, or curing wrinkles tend to be generated during ink curing. Against the above problems, a monofunctional monomer is used as a polymerizable compound in the range of 10-30% by mass, together with a compound represented by Formula (1) according to the present invention, whereby these problems are resolved. When the amount of the monofunctional monomer added is at most 30% by mass, the above targeted effects can sufficiently be expressed. In the case of at most 10% by mass, an excellent effect of enhancing flexibility can be exerted.

As the polymerizable monofunctional monomer, there are listed oxetane compounds OXT211, OXT212, OXT101, and OXT213 (all being trade names) (produced by Toagosei Co., Ltd.); and monofunctional epoxy compounds AOEX24 and AOEX68 (all being trade names) (produced by Dicel Chemical Industries, Ltd.).

As a polymerizable compound used for the active ray-curable ink of the present invention, any of the commonly known alicyclic epoxy compounds can be used, other than the above monofunctional epoxy compounds.

Of these, as the alicyclic epoxy compounds, preferable are cyclohexene oxide- or cyclopentene oxide-containing compounds obtained by epoxidizing compounds having at least one cycloalkane ring such as a cyclohexene ring or a cyclopentene ring using an appropriate oxidant such as hydrogen peroxide or a peracid. Specific examples include compounds listed below.

Preferable aliphatic epoxy compounds include di- or polyglycidyl ethers of aliphatic polyhydric alcohols or alkylene oxide adducts thereof. Typical examples thereof include diglycidyl ethers of alkylene glycols such as diglycidyl ethers of ethylene glycol, diglycidyl ethers of propylene glycol, or diglycidyl ethers of 1,6-hexanediol; polyglycidyl ethers of polyhydric alcohols such as di- or triglycidyl ethers of glycerin or alkylene oxide adducts thereof; and diglycidyl ethers of polyalkylene glycols such as diglycidyl ethers of polyethylene glycol or alkylene oxide adducts thereof or diglycidyl ethers of polypropylene glycol or alkylene oxide adducts thereof. Herein, the alkylene oxides include ethylene oxide and propylene oxide.

As a polymerizable compound used for the active ray-curable ink of the present invention, any of the commonly known vinyl ether compounds can be used.

For example, there are listed di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, or trimethylolpropane trivinyl ether; and monovinyl ether compounds such as ethyl vinyl ether, butyl vinyl ether, i-butyl vinyl ether, octadecyl vinyl ether, cyclohexyl vinyl ether, hydroxybutyl vinyl ether, 2-ethylhexyl vinyl ether, cyclohexanedimethanol monovinyl ether, propyl vinyl ether, i-propyl vinyl ether, i-propenyl ether-O-propylene carbonate, dodecyl vinyl ether, diethylene glycol monovinyl ether, or octadecyl vinyl ether.

Of these vinyl ether compounds, in view of curability, adhesion, and surface hardness, di- or trivinyl ether compounds are preferable, and divinyl ether compounds are specifically preferable.

As a polymerizable compound used for the active ray-curable ink of the present invention, any of the commonly known oxetane compounds can be used, other than the above monofunctional oxetane compounds. As employable oxetane compounds, any of the known oxetane compounds as described in JP-A Nos. 2001-220526 and 2001-310937 can be used.

As a photoinitiator used in the present invention, there are preferably used commonly known onium salts as described, for example, in "Application and Market of UV-EB Curing Technologies" (CMC Publishing Co., Ltd., supervised by Yoneho Tabata/edited by Rad Tech Japan). The content thereof is preferably at most 6% by mass in an active ray-curable ink. In the case of at most 6% by mass, ejection stability after frozen storage of at most −10° C. and after high temperature storage of at least 50° C. can be maintained. Further, as the initiator of the present invention, of the onium salts known in the art, a sulfonium salt is preferably used from the viewpoint of storage stability.

In the present invention, a modified silicone oil is preferably used.

The modified silicone oil is a compound modified by substituting a side chain and/or both terminals or a terminal of a polydimethylsiloxane with a substituent. Examples of a preferable substituent include an organic group having pyrrolidone or betaine and an organic group of a sulfuric acid salt type, a phosphoric acid salt type, or a quaternary ammonium salt type, in addition to an alkyl group, and a polyether or polyglycerin such as a polyalkylene oxide. In the present invention, of these, a polyether group or an alkyl group is preferable. But an alkyl group is specifically preferable for a system to realize the above effects of the present invention to a maximum extent.

Specific examples of a polyether-modified silicone include EFKA-3030, EFKA-3031, EFKA-3034, EFKA-3035, EFKA-3232, and EFKA-3033 (all being trade names) (produced by Efka Additives B.V.); and X-22-4272, X-22-4952, X-22-6266, KF-351, KF-945, and KF-6015 (all being trade names) (produced by Shin-Etsu Silicones Co.) with no specific limitation.

Specific examples of an alkyl-modified silicone include EFKA-3236, EFKA-3239, and EFKA-3522 (all being trade names) (produced by Efka Additives B.V.); KF-412, KF-413, and KF-415 (produced by Shin-Etsu Silicones Co.); and SH230 and SF8416 (all being trade names) (produced by Dow Corning Toray Co., Ltd.) with no specific limitation.

In the present invention, the modified silicone oil is preferably added in the range of 0.02% by mass-less than 3.0% by mass, more preferably in the range of 0.03% by mass-2.0% by mass, based on the total ink amount. When the added amount falls within the above-specified range, excellent ejection performance can be maintained and precipitation of an initiator and/or an anthracene derivative can be inhibited.

The active ray-curable ink of the present invention contains a various types of pigments known in the art.

Pigments preferably usable in the present invention will now be listed.

C.I. Pigment Yellow 1, 2, 3, 12, 13, 14, 16, 17, 73, 74, 75, 81, 83, 87, 93, 95, 97, 98, 109, 114, 120, 128, 129, 138, 150, 151, 154, 180, and 185

C. I. Pigment Red 5, 7, 12, 22, 38, 48:1, 48:2, 48:4, 49:1, 53:1, 57:1, 63:1, 101, 112, 122, 123, 144, 146, 168, 184, 185, and 202

C. I. Pigment Violet 19 and 23

C. I. Pigment Blue 1, 2, 3, 15:1, 15:2, 15:3, 15:4, 18, 22, 27, 29, and 60

C. I. Pigment Green 7 and 36

C. I. Pigment White

C. I. Pigment Magenta 18 and 21

C. I. Pigment Black 7

Further, in the present invention, to enhance color-hiding power for a transparent substrate such as a plastic film, white ink can be used. Specifically in soft packaging printing or label printing, white ink is preferably used.

For dispersion of any of the above pigments, there can be used, for example, a ball mill, a sand mill, an atliter, a roll mill, an agitator, a Henschel mixer, a colloid mill, an ultrasonic homogenizer, a pearl mill, a wet type jet mill, and a paint shaker.

Further, when a pigment is dispersed, a dispersant can also be added. As the dispersant, a polymer dispersant is preferably used. The polymer dispersant includes Solsperse series (produced by Avecia Co.) and PB series (produced by Ajinomoto Fine-Techno Co., Inc.). Further, as a dispersion aid, synergists suitable for pigments of various types can be used. Such a dispersant and a dispersion aid are preferably added at a ratio of 1-50 parts by mass based on 100 parts by mass of a pigment.

A solvent or a polymerizable compound is used as a dispersion medium. However, a radiation curable-type ink employed in the present invention is preferably used with no solvent in order to induce its reaction and curing immediately after ink deposition. When a solvent remains in a cured image, solvent resistance is deteriorated and a VOC problem caused by the residual solvent is produced. Accordingly, as the dispersion medium, not a solvent, but a polymerizable compound, specifically a monomer with lowest viscosity is preferably selected in view of dispersion adaptability.

In pigment dispersion, the average particle diameter of pigment particles is preferably 0.08-0.2 µm, and to control the maximum particle diameter to be 0.3-10 µm, preferably 0.3-3 µm, a pigment, a dispersant, and a dispersion medium are selected and also dispersion conditions and filtration conditions are appropriately set. This particle diameter control makes it possible to inhibit the clogging of a head nozzle and maintain ink storage stability, ink transparency, and curing sensitivity.

In an ink-jet ink according to the present invention, the concentration of a colorant is preferably 1% by mass-10% by mass based on the total ink amount.

For the active ray-curable ink of the present invention, various additives can be used, other than those described above. There can be added, for example, a surfactant, a leveling additive, and a matting agent, as well as a polyester resin, a polyurethane resin, a vinyl resin, an acrylic resin, a rubber-based resin, or a wax functioning to regulate film physical properties.

Further, to improve storage stability, any of the commonly known basic compounds can be used. Typical examples thereof include basic alkali metal compounds, basic alkaline earth metal compounds, and basic organic compounds such as amines.

Further, it is possible to combine a radically polymerizable monomer with an initiator to give a radical/cationic hybrid-type curable ink.

The viscosity of the ink of the present invention is preferably 7-100 mPa·s at 25° C. to realize ejection stability and excellent curability regardless of curing ambience (temperature and humidity).

As recording media usable in the present invention, there can be used various non-absorptive plastics and films thereof employed for so-called soft packaging, in addition to common non-coated paper and coated paper. Examples of such various plastic films include PET film, OPS film, OPP film, ONy film, PVC film, PE film, and TAC film. As other plastics, polycarbonate, acrylic resins, ABS, polyacetal, PVA, and rubber are usable. Metals and glass are also applicable. Of these recording media, when an image is formed specifically on a thermoshrinkable PET film, OPS film, OPP film, ONy film, or PVC film, the constitution of the present invention can be effective. These substrates tend to cause film curling and deformation due to curing contraction of the ink and heat generated during curing reaction, and also the ink film is difficult to conform to substrate contraction.

The surface energies of these various types of plastic films differ significantly. Consequently, there has been noted such a problem that the dot diameter after ink deposition varies, depending on the recording media. However, according to the constitution of the present invention, it is possible to form excellent highly detailed images on a wide variety of recording media exhibiting a surface energy of 35-60 mN/m, including OPP film and OPS film exhibiting low surface energy and PET film exhibiting relatively high surface energy.

The active ray-curable ink of the present invention is characterized by being specifically applicable to an ink used to form an image on fibrous materials (media) such as a textile. Such fibrous materials are not specifically limited and various materials are usable. However, synthetic fibers are preferable. Examples of synthetic fibers according to the present invention include synthetic fibers available on the market such as polyester fiber, polyamide fiber, polyvinyl alcohol fiber, polyethylene fiber, polypropylene fiber, or polyaramid fiber. Fabrics made of synthetic fibers include woven fabric, knitted fabric, and nonwoven fabric formed from the above synthetic fibers. Incidentally, the active ray-curable ink of the present invention is suitable for an ink used to form an image specifically on a polyester fibrous material among the above synthetic fibers, and can form an image, free from a peeled cured film, on a polyester fibrous material without impairing feel of quality of the recording medium.

In the present invention, from the viewpoint of recording medium cost such as packaging expense and production cost, print production efficiency, and suitability for various print sizes, it is advantageous to use long-length (web) recording media.

Next, the method for forming an image of the present invention will now be described.

The method for forming an image of the present invention is a method wherein the above ink is ejected onto a recording medium via an ink-jet recording method to form an image, and then the ink is cured via irradiation of active rays such as UV radiation.

(Total Ink Film Thickness after Ink Deposition)

In the present invention, after deposition of an ink on a recording medium and curing via irradiation of active rays, the total ink film thickness is preferably 2-20 µm. In active ray-curable ink-jet recording in the screen printing field, at present, the total ink film thickness exceeds 25 µm. In the soft packaging printing field in which thin plastic materials are frequently used as recording media, in addition to the above problems such as curling and wrinkling of recording media, there are also produced such problems that stiffness and feel of quality of the printed matter as a whole vary. Therefore, ink ejection which results in an excessively thick film is not preferable.

Herein, "total ink film thickness" refers to the maximum value of the ink film thickness of an image recorded on a recording medium. The meaning of the above total ink film thickness is the same as in cases in which recording is conducted via a single color ink-jet recording method, as well as a 2-color superimposing (secondary color), 3-color superimposing, or 4-color superimposing (white ink base) ink-jet recording method.

(Ink Ejection Conditions)

To ensure ejection stability, with regard to ink ejection conditions, it is preferable to heat the recording head and the ink at 35-100° C. for ejection. An active ray-curable ink results in a wide variation of viscosity due to the change of temperature. Viscosity variation directly affects the size of droplets and the rate of droplet ejection significantly, resulting in degraded image quality. Accordingly, it is necessary to raise ink temperature and maintain the resulting temperature at a constant value. The control width of the ink temperature falls within a specified temperature of ±5° C., preferably within a specified temperature of ±2° C., more preferably ±1° C.

Further, in the present invention, the droplet amount ejected from each nozzle is preferably 2-15 pl.

Essentially, in order to form highly detailed images, the droplet volume needs to fall within this range. However, when this droplet volume is ejected, the above ejection stability particularly becomes deteriorated. According to the present invention, even when the ink is ejected at such a small droplet amount as a droplet amount of 2-15 pl, ejection stability is enhanced and highly detailed images can stably be formed.

(Radiation Irradiation Conditions after Ink Deposition)

In the method for forming an image of the present invention, with regard to active ray irradiation conditions, active rays are irradiated preferably 0.001 second-1.0 second after ink deposition, more preferably 0.001 second-0.5 second thereafter. In order to form highly detailed images, it is specifically critical that irradiation timing is as early as possible.

The basic method of active ray irradiation methods is disclosed in JP-A No. 60-132767. Based on this document, radiation sources are arranged on both sides of a head unit, and the head and the radiation sources are scanned via a shuttle method. Irradiation is carried out within a specified period of time after ink deposition. Further, curing is completed with another radiation source being stationary. U.S. Pat. No. 6,145,979 discloses, as an irradiation method, one utilizing optical fibers and another one in which UV radiation is irradiated to a recording section by hitting collimated radiation onto a mirror surface provided on the side of the head unit. In the method for forming an image of the present invention, either of these irradiation methods can be used.

Further, the following method is one of the preferred embodiments: active ray irradiation is divided into two stages; initially, active rays are irradiated 0.001-2.0 seconds after ink deposition via the above method; and after completion of entire printing, active rays are further irradiated. By dividing active ray irradiation into two stages, it becomes possible to inhibit contraction of a recording medium which occurs during ink curing.

Conventionally, in a UV ink-jet system, it has been common that a high illuminance radiation source, whose total power consumption exceeds 1 kW·hr, is used to inhibit dot spreading and bleeding after ink deposition.

However, when such a radiation source is used, specifically in shrink label printing, the contraction of a recording medium is excessively large, whereby it has been substantially impossible to use the above radiation source.

Further, in the present invention, the total power consumption of a radiation source for active ray irradiation is preferably less than 1 kW·hr. Examples of such a radiation source whose total power consumption is less than 1 kW·hr include fluorescent lamps, cold-cathode tubes, hot-cathode tubes, and LEDs, but there is no limitation thereto.

Next, an ink-jet recording apparatus (hereinafter also referred to simply as a recording apparatus) applicable to the present invention will now be described.

The recording apparatus applicable to the present invention is described below with reference to drawings as necessary.

FIG. 1 is a side view showing a main section constitution of the recording apparatus of the present invention. Recording apparatus 1 is structured by being mainly provided with head carriage 2, recording head 3, irradiation member 4, and platen section 5. In recording apparatus 1, platen section 5 is arranged under recording medium P. Platen section 5 functions to absorb UV radiation and absorbs any extra UV radiation which has passed through recording medium P. Thereby, highly detailed images can be reproduced very stably.

Recording medium P is guided by guide member 6 and is transported from the front to the rear in FIG. 1 via the operation of a transporting member (not shown). A head scanning member (not shown) allows head carriage 2 to reciprocate in direction Y in FIG. 1, whereby scanning of recording head 3 held by head carriage 2 is carried out.

Head carriage 2 is arranged above recording medium P, and a plurality of recording heads 3, described below, corresponding to the number of colors used for image printing on recording medium P are housed so that the ejection orifices are arranged on the lower side. Head carriage 2 is arranged for recording apparatus 1 main body to enable reciprocation in direction Y in FIG. 1. Via driving of the head scanning member, reciprocation is conducted in direction Y in FIG. 1.

Herein, FIG. 1 is drawn so that head carriage 2 houses recording heads 3 for white (W), yellow (Y), magenta (M), cyan (C), black (B), light yellow (Ly), light magenta (Lm), light cyan (Lc), light black (Lb), and white (W). In practice, the number of colors of recording heads 3 housed in head carriage 2 is appropriately determined.

Recording head 3 ejects an active ray-curable ink (for example, a UV curable ink) fed by an ink feeding member (not shown) onto recording medium P from the ejection orifice via action of a plurality of ejection members (not shown) provided within the interior. The UV ink ejected from recording head 3 is composed of a colorant, a polymerizable monomer, and an initiator, and exhibits a property such that when irradiated to UV radiation, the initiator functions as a catalyst to perform curing of the monomer via cross-linking and polymerization reaction.

Recording head 3 moves from one end of recording medium P to the other end thereof in direction Y in FIG. 1 via driving of a scanning member. Then, during this scanning, the ink is ejected onto a specified area (being a depositable area) of recording medium P in the form of ink droplets and then the ink droplets are deposited onto the depositable area.

The above scanning is carried out at a specified number of times to eject the UV ink onto one depositable area. Thereafter, recording medium P is appropriately moved from the front to the rear in FIG. 1 via the transporting member. While scanning using the scanning member is carried out again, the UV ink is ejected onto a next depositable area adjacent to the above depositable area in the rearward direction in FIG. 1.

The above operation is repeated. And, by ejecting the UV ink from recording head 3 under synchronization with the head scanning member and the transporting member, an image composed of an aggregate of UV ink droplets is formed on recording medium P.

Irradiation member 4 is composed of a UV lamp which emits UV radiation having a specified wavelength range at stable exposure energy, and a filter which transmits UV radiation of a specified wavelength. Herein, applicable UV lamps include mercury lamps, metal halide lamps, excimer lasers, UV lasers, cold-cathode tubes, hot-cathode tubes, blacklights, and LEDs (light emitting diodes). Of these, preferable are band-shaped metal halide lamps, cold-cathode tubes, hot-cathode tubes, mercury lamps, or blacklights.

Irradiation member 4 is nearly similar in size to the maximum capable of being set for recording apparatus (being a UV ink-jet printer) 1 or to be larger in size than the depositable area among the depositable area on which the UV ink is ejected via one scanning of recording head 3 driven by the head scanning member.

Irradiation member 4 is fixed on both sides of head carriage 2 to become nearly parallel to recording medium P.

As described above, illuminance at the ink ejection section is regulated, of course, by shielding entire recording head 3 from light. Further, it is effective that distance h1 between irradiation member 4 and recording medium P is set to be smaller than distance h2 between ink ejection section 31 of recording head 3 and recording medium P (namely, h1<h2); and also distance d between recording head 3 and irradiation member 4 is set to be far (namely, d is set to be long). Still further, it is more preferable that bellows structure 7 is arranged between recording head 3 and irradiation member 4.

Herein, it is possible to appropriately change the wavelength of UV radiation irradiated by irradiation member 4 by replacing a UV lamp or a filter provided for irradiation member 4.

The ink of the present invention exhibits excellent ejection stability and effectively works specifically during image formation using a line head-type recording apparatus.

Figure 2:
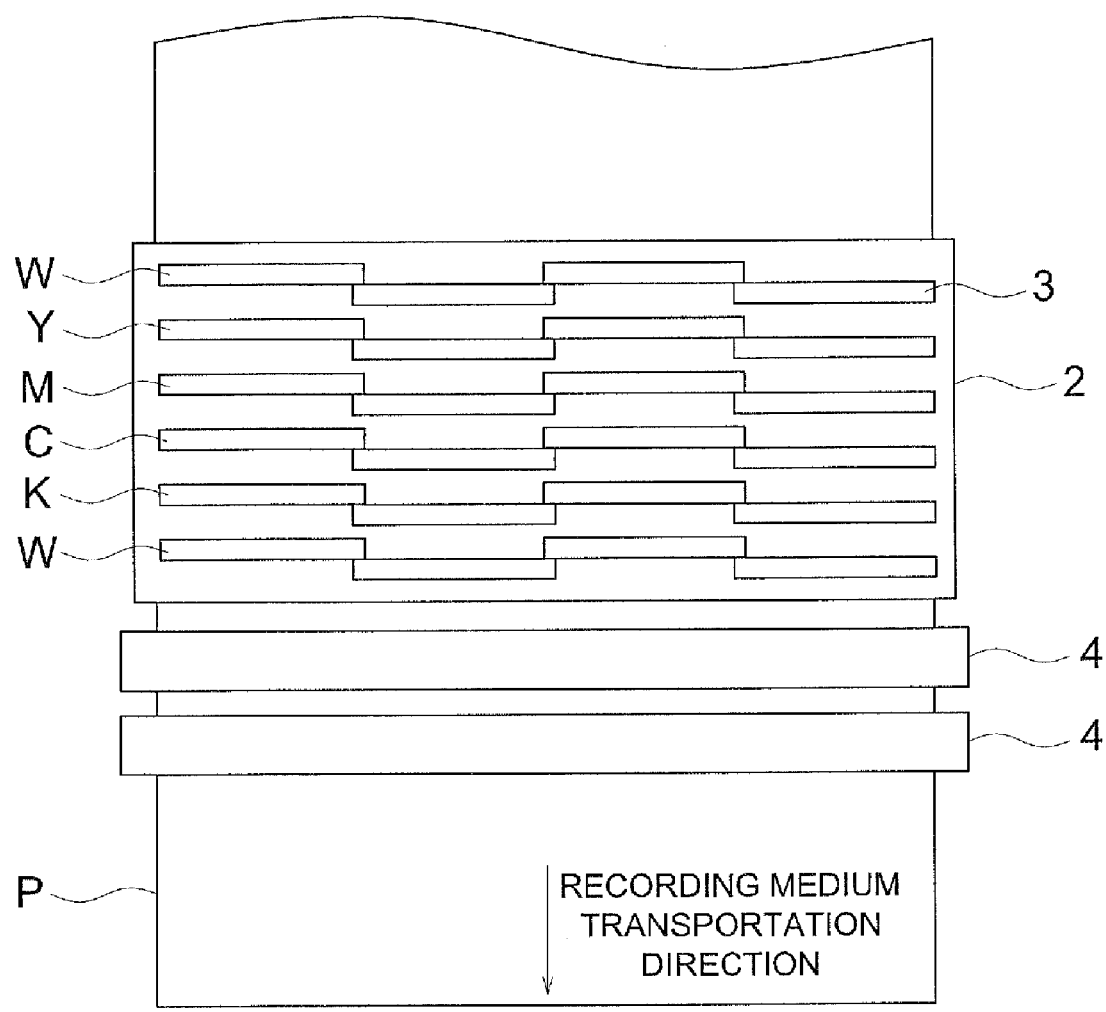

FIG. 2 is a top view showing another example of a main section constitution of an ink-jet recording apparatus.

The ink-jet recording apparatus shown in FIG. 2 is referred to as a line head system, and a plurality of ink-jet recording heads 3 of individual colors are fixing arranged on head carriage 2 to cover the entire width of recording medium P.

On the other hand, on the downstream side of head carriage 2, irradiation member 4 is arranged to cover the entire area of ink printing so that the entire width of recording medium P is similarly covered. As a UV lamp used for irradiation member 4, one similar to the one shown in FIG. 1 can be used.

In this line head system, head carriage 2 and irradiation member 4 are fixed and only recording medium P is transported to carry out image formation via ink ejection and curing.

EXAMPLES

The present invention will now specifically be described with reference to examples, but the embodiments of the present invention are not limited thereto.

Example 1

Synthesis of Polyurethanes

There were mixed 3-methyl-1,5-pentanediol and an excessive amount of trimethylhexamethylene diisocyanate to carry out reaction while stirring at 180° C. Subsequently, ethylenediamine was added as a chain elongation agent, followed by further stirring. Then, n-propylamine was added as a reaction terminator and reaction duration was controlled so as for weight average molecular weight to become each value of following exemplified compounds A-D. Thus, exemplified compounds A-D were synthesized.

Exemplified compound A: weight average molecular weight 2000
Exemplified compound B: weight average molecular weight 3500
Exemplified compound C: weight average molecular weight 8000
Exemplified compound D: weight average molecular weight 15000

Further, similarly, adipic acid, pentanediol, and an excessive amount of hexamethylene diisocyanate were used and n-propylamine as a reaction terminator was added. Then, reaction duration was controlled so as for weight average molecular weight to become each value of following exemplified compounds E-H. Thus, exemplified compounds E-H were synthesized.

Exemplified compound E: weight average molecular weight 1500
Exemplified compound F: weight average molecular weight 3000
Exemplified compound G: weight average molecular weight 9000
Exemplified compound H: weight average molecular weight 13000

<<Preparation of Pigment Dispersion 1>>

Pigment dispersion 1 of magenta was prepared by dispersing a pigment as follows.

The following 2 compounds were placed in a stainless steel beaker and dissolved by heating and stirring for 1 hour while heated on a hot plate at 65° C.

| | |
|---|---|
| PB822 (a dispersion, produced by Ajinomoto Fine-Techno Co., Inc.) | 16 parts |
| OXT-221 (produced by Toagosei Co., Ltd.) | 44 parts |

After cooling to room temperature, 40 parts of following pigment 1 was added to the resulting product, followed by being placed in a glass bottle together with 200 g of zirconia beads of a diameter of 0.5 mm and sealed. Dispersion was carried out using a paint shaker for a period of time described below, followed by removal of the zirconia beads to prepare pigment dispersion 1 of magenta.

Pigment 1: Pigment Red 122 (produced by Dainichiseika Color & Chemicals Mfg. Co., Ltd.; Chromofine Red 8 added)

<<Preparation of Active Ray-Curable Inks>>

The compositions listed in Tables 1-6 were mixed and dissolved to prepare active ray-curable inks 1-7, respectively.

TABLE 1

| Active Ray-curable Ink 1 (Comparative) | | Content (% by mass) |
|---|---|---|
| Pigment dispersion | pigment 1 | 30.0 |
| Urethane acrylate (reactive group-containing urethane) | Art Resin UN333 | 20.0 |
| Polymerizable compound (alicyclic epoxy compound) | Celoxide 2021P (Dicel Chemical Industries, Ltd.) | 20.0 |
| Polymerizable compound (oxetane compound) | OXT-221 (Toagosei Co., Ltd.) | 17.0 |
| Polymerizable compound (monofunctional oxetane compound) | OXT-101 (Toagosei Co., Ltd.) | 8.0 |
| Photolytically acid generating agent (propylene carbonate 50% solution) | UVI6992 (Dow Chemicals Co.) | 5.0 |

TABLE 2

| Active Ray-curable Ink 2 (Comparative) | | Content (% by mass) |
|---|---|---|
| Pigment dispersion | pigment 1 | 30.0 |
| Urethane polymer exemplified compound | — | 0.0 |
| Polymerizable compound (alicyclic epoxy compound) | Celoxide 2021P (Dicel Chemical Industries, Ltd.) | 53.0 |
| Polymerizable compound (oxetane compound) | OXT-221 (Toagosei Co., Ltd.) | 5.0 |
| Polymerizable compound (monofunctional oxetane compound) | OXT-101 (Toagosei Co., Ltd.) | 5.0 |
| Photolytically acid generating agent (propylene carbonate 50% solution) | UVI6992 (Dow Chemicals Co.) | 5.0 |
| Anthracene derivative | DEA (Kawasaki Kasei Chemicals Ltd.) | 2.0 |

TABLE 3

| Active Ray-curable Ink 3 (Inventive) | | Content (% by mass) |
|---|---|---|
| Pigment dispersion | pigment 1 | 30.0 |
| Urethane polymer exemplified compound | C | 20.0 |
| Polymerizable compound (alicyclic epoxy compound) | Celoxide 2021P (Dicel Chemical Industries, Ltd.) | 33.5 |

TABLE 3-continued

| Active Ray-curable Ink 3 (Inventive) | | Content (% by mass) |
|---|---|---|
| Polymerizable compound (oxetane compound) | OXT-221 (Toagosei Co., Ltd.) | 5.0 |
| Polymerizable compound (monofunctional oxetane compound) | OXT-101 (Toagosei Co., Ltd.) | 5.0 |
| Photolytically acid generating agent (propylene carbonate 50% solution) | UVI6992 (Dow Chemicals Co.) | 5.0 |
| Anthracene derivative exemplified compound | A-2 | 1.5 |

TABLE 4

| Active Ray-curable Ink 4 (Inventive) | | Content (% by mass) |
|---|---|---|
| Pigment dispersion | pigment 1 | 30.0 |
| Urethane polymer exemplified compound | D | 15.0 |
| Polymerizable compound (alicyclic epoxy compound) | Celoxide 2021P (Dicel Chemical Industries, Ltd.) | 24.0 |
| Polymerizable compound (oxetane compound) | OXT-221 (Toagosei Co., Ltd.) | 10.0 |
| Polymerizable compound (monofunctional oxetane compound) | OXT-212 (Toagosei Co., Ltd.) | 15.0 |
| Photolytically acid generating agent (propylene carbonate 75% solution) | ESACURE1187 (Ninon SiberHegner K.K.) | 4.0 |
| Anthracene derivative exemplified compound | A-3 | 2.0 |

TABLE 5

| Active Ray-curable Ink 5 (Inventive) | | Content (% by mass) |
|---|---|---|
| Pigment dispersion | pigment 1 | 30.0 |
| Urethane polymer exemplified compound | G | 10.0 |
| Polymerizable compound (alicyclic epoxy compound) | EP-1 | 25.5 |
| Polymerizable compound (monofunctional epoxy compound) | AOEX68 (Dicel Chemical Industries, Ltd.) | 10.0 |
| Polymerizable compound (oxetane compound) | OXT-121 (Toagosei Co., Ltd.) | 10.0 |
| Polymerizable compound (monofunctional oxetane compound) | OXT-213 (Toagosei Co., Ltd.) | 10.0 |
| Photolytically acid generating agent | DTS-102 (Midori Kagaku Co., Ltd.) | 3.0 |
| Anthracene derivative exemplified compound | A-32 | 1.5 |

TABLE 6

| Active Ray-curable Ink 6 (Inventive) | | Content (% by mass) |
|---|---|---|
| Pigment dispersion | pigment 1 | 30.0 |
| Urethane polymer exemplified compound | H | 10.0 |
| Polymerizable compound (alicyclic epoxy compound) | Celoxide 3000 (Dicel Chemical Industries, Ltd.) | 20.5 |
| Polymerizable compound (monofunctional epoxy compound) | AOEX24 (Dicel Chemical Industries, Ltd.) | 10.0 |
| Polymerizable compound (oxetane compound) | OXT-121 (Toagosei Co., Ltd.) | 15.0 |
| Polymerizable compound (monofunctional oxetane compound) | OXT-211 (Toagosei Co., Ltd.) | 10.0 |
| Photolytically acid generating agent | CI5102 (Nippon Soda Co., Ltd.) | 3.0 |
| Anthracene derivative exemplified compound | A-20 | 1.5 |

TABLE 7

| Active Ray-curable Ink 7 (Inventive) | | Content (% by mass) |
|---|---|---|
| Pigment dispersion | pigment 1 | 30.0 |
| Urethane polymer exemplified compound | B | 20.0 |
| Polymerizable compound (alicyclic epoxy compound) | Celoxide 2021P (Dicel Chemical Industries, Ltd.) | 8.5 |
| Polymerizable compound (monofunctional epoxy compound) | AOEX68 (Dicel Chemical Industries, Ltd.) | 10.0 |
| Polymerizable compound (vinyl ether compound) | CHVE (ISP Japan Ltd.) | 15.0 |
| Polymerizable compound (vinyl ether compound) | DVE-3 (ISP Japan Ltd.) | 10.0 |
| Photolytically acid generating agent (propylene carbonate 50% solution) | UVI6992 (Dow Chemicals Co.) | 5.0 |
| Anthracene derivative exemplified compound | A-33 | 1.5 |

<<Evaluation of Active Ray-Curable Inks>>

[Cured Film Formation]

Each of the above-prepared active ray-curable inks was coated on a polyethylene terephthalate film of a thickness of 40 μm at a film thickness of 6 μm via wire-bar coating. Under a high humidity ambience of 27° C. and 80% RH, using radiation source VZero085 (produced by Integration Technology Inc.), the coated film having been formed was allowed to pass 2 cm under the radiation source at an A bulb output of 80 W/cm at a velocity of 500 mm/second to obtain cured samples 1-7.

Further, the above cured film-forming process was repeated 10 times to produce cured samples 1A-7A of a total film thickness of about 60 μm.

[Evaluation of Cured Films]

The following evaluations were carried out with respect to each of cured samples 1-7 and 1A-7A obtained via the above methods.

[Hardness Determination of Cured Films]

With regard to each of cured samples 1-7 obtained via the method, hardness of each cured material was determined via a method in conformity with the pencil scratch test (JIS K 5400).

Hardness ranks are lined up in the following order: (soft) 6B-B, HB, F, H-9H (hard) in which 6B is softest and 9H is hardest, and the harder, the more preferable.

[Substrate Adhesion Evaluation: Cross-Cut Tape-Peeling Residual Adhesion Ratio Test]

With regard to each of cured samples 1-7 obtained via the above method, a grid pattern was formed on the surface thereof via a cross-cut test method complying with JIS K 5400. Then, an adhesive tape (SCOTCH #250, produced by Sumitomo 3M Ltd.) was allowed to adhere to the surface, followed by pressure bonding via a reciprocation of a 2 kg roller. Thereafter, peeling was carried out at a breath and then the number of residual cross-cut portions was measured to determine the residual ratio. A larger residual ratio indicates superior adhesion to the substrate.

[Flexibility Evaluation of Cured Films]

Each of cured samples 1A-7A was wound around a stainless steel bar of a diameter of 3 mm so that the cured side faced outward. Then, the state of occurrence of bending cracks was visually observed. Flexibility was evaluated based on the following criteria.

A: No cracks are generated even by bending (winding) of multiple times.

B: Crack occurrence is noted by bending (winding) of multiple times.

C: Cracks are generated by bending (winding) conducted once.

Each of the obtained evaluation results is shown in Table 8.

TABLE 8

|   | Cured Film Hardness | Substrate Adhesion (%) | Flexibility | Remarks |
|---|---|---|---|---|
| 1 | 2B | 35 | A | comparative |
| 2 | 3H | 20 | C | comparative |
| 3 | H | 70 | A | inventive |
| 4 | 3H | 65 | A | inventive |
| 5 | H | 70 | A | inventive |
| 6 | 4H | 75 | A | inventive |
| 7 | 4H | 53 | B | inventive |

The results described in Table 8 clearly show that any cured film formed using an active ray-curable ink employing the constitution specified by the present invention exhibits excellent properties with respect to each of hardness, substrate adhesion, and flexibility.

Example 2

Preparation of Pigment Dispersions

Each pigment was dispersed with the following composition to prepare pigment dispersions 2-5.

Two kinds of compounds described below were placed in a stainless steel beaker and dissolved by heating and stirring for 1 hour while heated on a hot plate at 65° C.

| | |
|---|---|
| PB822 (a disperser, produced by Ajinomoto Fine-Techno Co., Inc.) | 9 parts |
| OXT-221 (produced by Toagosei Co., Ltd.) | 71 parts |

After cooling to room temperature, 20 g of each of pigments 2-5 described bellow was added to the resulting product, followed by being placed in a glass bottle together with 200 g of zirconia beads of a diameter of 0.5 mm and sealed. Dispersion was carried out using a paint shaker for the following dispersion time, followed by removal of the zirconia beads to prepare pigment dispersions 2-5.

| | |
|---|---|
| Pigment 2: Pigment Black 7 (#52, produced by Mitsubishi Chemical Corp.) | 10 hours |
| Pigment 3: Pigment Blue 15:4 (Cyanine Blue 4044, produced by Dainichiseika Color & Chemicals Mfg. Co., Ltd.) | 9 hours |
| Pigment 4: Pigment Yellow 150 (E4GN-GT CH20015, produced by Lanxess AG) | 8 hours |
| Pigment 5: Pigment Red 122 (CFR-321, produced by Dainichiseika Color & Chemicals Mfg. Co., Ltd.) | 10 hours |
| Pigment 6: titanium oxide (anatase-type, particle diameter: 0.2 μm) | 10 hours |

<<Preparation of Ink-Jet Inks>>

Active ray-curable inks of individual colors composed of each composition listed in Tables 9-15 was prepared under a condition of 25° C. and 50% RH, and filtered with a TEFLON (a trademark) membrane filter of 3 μm (produced by Advatec Co.) to prepare ink sets 1-7 composed of 9 kinds of inks (K, C, M, Y, W, Lk, Lc, Lm, and Ly).

The detail of each designation described in Tables 9-15 is as follows:

K: Deep black ink
C: Deep cyan ink
M: Deep magenta ink
Y: Deep yellow ink
W: White ink
Lk: Light black ink
Lc: Light cyan ink
Lm: Light magenta ink
Ly: Light yellow ink

TABLE 9

Ink Set 1 (comparative)
Viscosity of Each Color 33-36 mPa · s (25° C.)

| | | Content (% by mass) | | | | | | | | |
|---|---|---|---|---|---|---|---|---|---|---|
| | | K | C | M | Y | W | LK | LC | LM | LY |
| Pigment species | | 2 | 3 | 5 | 4 | 6 | 2 | 3 | 5 | 4 |
| Pigment dispersion | | 7.5 | 7.5 | 16.5 | 13.5 | 40.0 | 1.9 | 1.9 | 4.1 | 3.4 |
| Polymerizable compound (alicyclic epoxy compound, bifunctional) | Celoxide 2021P (Dicel Chemical Industries, Ltd.) | 30.0 | 30.0 | 30.0 | 30.0 | 20.0 | 40.0 | 40.0 | 40.0 | 40.0 |
| Polymerizable compound (oxetane compound, bifunctional) | OXT-221 (Toagosei Co., Ltd.) | 43.3 | 43.3 | 34.3 | 37.3 | 20.8 | 38.9 | 38.9 | 36.7 | 37.4 |
| Polymerizable compound (oxetane compound, monofunctional) | OXT-101 (Toagosei Co., Ltd.) | 5.0 | 5.0 | 5.0 | 5.0 | 5.0 | 5.0 | 5.0 | 5.0 | 5.0 |
| Polymerizable compound (oxetane compound, monofunctional) | OXT-211 (Toagosei Co., Ltd.) | 10.0 | 10.0 | 10.0 | 10.0 | 10.0 | 10.0 | 10.0 | 10.0 | 10.0 |

TABLE 9-continued

Ink Set 1 (comparative)
Viscosity of Each Color 33-36 mPa·s (25° C.)

|  |  | Content (% by mass) | | | | | | | | |
|---|---|---|---|---|---|---|---|---|---|---|
|  |  | K | C | M | Y | W | LK | LC | LM | LY |
| Surfactant | X-22-4272 (Shin-Etsu Silicones Co.) | 0.10 | 0.10 | 0.10 | 0.10 | 0.10 | 0.10 | 0.10 | 0.10 | 0.10 |
| Basic compound | triisopropanolamine | 0.10 | 0.10 | 0.10 | 0.10 | 0.10 | 0.10 | 0.10 | 0.10 | 0.10 |
| Photoinitiator | ESACURE1187 (Nihon SiberHegner K.K.) | 4.0 | 4.0 | 4.0 | 4.0 | 4.0 | 4.0 | 4.0 | 4.0 | 4.0 |

TABLE 10

Ink Set 2 (comparative)
Viscosity of Each Color 33-36 mPa·s (25° C.)

|  |  | Content (% by mass) | | | | | | | | |
|---|---|---|---|---|---|---|---|---|---|---|
|  |  | K | C | M | Y | W | Lk | Lc | Lm | Ly |
| Pigment species |  | 2 | 3 | 5 | 4 | 6 | 2 | 3 | 5 | 4 |
| Pigment dispersion |  | 7.5 | 7.5 | 16.5 | 13.5 | 40.0 | 1.9 | 1.9 | 4.1 | 3.4 |
| Urethane-modified epoxy (a reactive group-containing urethane) | ADECA RESIN EPU-17T-6 (Asahi Denka Kogyo K.K.) | 7.5 | 7.5 | 5.0 | 5.0 | 3.0 | 5.0 | 5.0 | 5.0 | 5.0 |
| Polymerizable compound (alicyclic epoxy compound, bifunctional) | EP-1 | 25.0 | 25.0 | 25.0 | 25.0 | 20.0 | 25.0 | 25.0 | 25.0 | 25.0 |
| Polymerizable compound (oxetane compound, bifunctional) | OXT-221 (Toagosei Co., Ltd.) | 37.8 | 38.3 | 31.8 | 34.8 | 22.8 | 44.4 | 44.4 | 42.2 | 42.9 |
| Polymerizable compound (oxetane compound, monofunctional) | OXT-212 (Toagosei Co., Ltd.) | 18.0 | 18.0 | 18.0 | 18.0 | 10.0 | 20.0 | 20.0 | 20.0 | 20.0 |
| Basic compound | N-ethyldiethanolamine | 0.10 | 0.10 | 0.10 | 0.10 | 0.10 | 0.10 | 0.10 | 0.10 | 0.10 |
| Surfactant | KF-352 (Shin-Etsu Silicones Co.) | 0.10 | 0.10 | 0.10 | 0.10 | 0.10 | 0.10 | 0.10 | 0.10 | 0.10 |
| Photoinitiator | DTS-102 (Midori Kagaku Co., Ltd.) | 3.0 | 2.5 | 2.5 | 2.5 | 3.0 | 2.5 | 2.5 | 2.5 | 2.5 |
| Anthracene derivative | DBA (Kawasaki Kasei Chemicals Ltd.) | 1.0 | 1.0 | 1.0 | 1.0 | 1.0 | 1.0 | 1.0 | 1.0 | 1.0 |

TABLE 11

Ink Set 3 (inventive)
Viscosity of Each Color 40-43 mPa·s (25° C.)

|  |  | Content (% by mass) | | | | | | | | |
|---|---|---|---|---|---|---|---|---|---|---|
|  |  | K | C | M | Y | W | Lk | Lc | Lm | Ly |
| Pigment species |  | 2 | 3 | 5 | 4 | 6 | 2 | 3 | 5 | 4 |
| Pigment dispersion |  | 7.5 | 7.5 | 16.5 | 13.5 | 40.0 | 1.9 | 1.9 | 4.1 | 3.4 |
| Polymerizable compound (alicyclic epoxy compound, bifunctional) | Celoxide 2021P (Dicel Chemical Industries, Ltd.) | 25.0 | 25.0 | 25.0 | 25.0 | 20.0 | 35.0 | 35.0 | 35.0 | 35.0 |
| Polymerizable compound (oxetane compound, bifunctional) | OXT-221 (Toagosei Co., Ltd.) | 37.3 | 37.3 | 30.8 | 31.3 | 18.8 | 32.9 | 32.9 | 30.7 | 31.4 |
| Polymerizable compound (oxetane compound, monofunctional) | OXT-101 (Toagosei Co., Ltd.) | 5.0 | 5.0 | 5.0 | 5.0 | 3.0 | 5.0 | 5.0 | 5.0 | 5.0 |
| Polymerizable compound (oxetane compound, monofunctional) | OXT-211 (Toagosei Co., Ltd.) | 10.0 | 10.0 | 10.0 | 10.0 | 8.0 | 10.0 | 10.0 | 10.0 | 10.0 |
| Urethane polymer exemplified compound | A | 10.0 | 10.0 | 7.5 | 10.0 | 5.0 | 10.0 | 10.0 | 10.0 | 10.0 |
| Surfactant | X-22-4272 (Shin-Etsu Silicones Co.) | 0.10 | 0.10 | 0.10 | 0.10 | 0.10 | 0.10 | 0.10 | 0.10 | 0.10 |
| Basic compound | triisopropanolamine | 0.10 | 0.10 | 0.10 | 0.10 | 0.10 | 0.10 | 0.10 | 0.10 | 0.10 |
| Photoinitiator | ESACURE1187 (Nihon SiberHegner K.K.) | 4.0 | 4.0 | 4.0 | 4.0 | 4.0 | 4.0 | 4.0 | 4.0 | 4.0 |

TABLE 11-continued

Ink Set 3 (inventive)
Viscosity of Each Color 40-43 mPa·s (25° C.)

|  |  | K | C | M | Y | W | Lk | Lc | Lm | Ly |
|---|---|---|---|---|---|---|---|---|---|---|
|  |  |  |  |  |  |  |  | Content (% by mass) | | |
| Anthracene derivative exemplified compound | A-32 | 1.0 | 1.0 | 1.0 | 1.0 | 1.0 | 1.0 | 1.0 | 1.0 | 1.0 |

TABLE 12

Ink Set 4 (inventive)
Viscosity of Each Color 36-38 mPa·s (25° C.)

|  |  | K | C | M | Y | W | Lk | Lc | Lm | Ly |
|---|---|---|---|---|---|---|---|---|---|---|
|  |  |  |  |  |  |  |  | Content (% by mass) | | |
| Pigment species |  | 2 | 3 | 5 | 4 | 6 | 2 | 3 | 5 | 4 |
| Pigment dispersion |  | 7.5 | 7.5 | 16.5 | 13.5 | 40.0 | 1.9 | 1.9 | 4.1 | 3.4 |
| Urethane polymer exemplified compound | B | 7.5 | 7.5 | 5.0 | 5.0 | 3.0 | 7.5 | 7.5 | 7.5 | 7.5 |
| Polymerizable compound (alicyclic epoxy compound, bifunctional) | EP-1 | 20.0 | 20.0 | 20.0 | 20.0 | 15.0 | 25.0 | 25.0 | 25.0 | 25.0 |
| Polymerizable compound (oxetane compound, bifunctional) | OXT-221 (Toagosei Co., Ltd.) | 42.8 | 43.3 | 36.8 | 39.8 | 27.8 | 41.9 | 41.9 | 39.7 | 40.4 |
| Polymerizable compound (oxetane compound, monofunctional) | OXT-212 (Toagosei Co., Ltd.) | 18.0 | 18.0 | 18.0 | 18.0 | 10.0 | 20.0 | 20.0 | 20.0 | 20.0 |
| Basic compound | KILESCOAT ZB (Chelest Corp.) | 0.10 | 0.10 | 0.10 | 0.10 | 0.10 | 0.10 | 0.10 | 0.10 | 0.10 |
| Surfactant | KF-352 (Shin-Etsu Silicones Co.) | 0.10 | 0.10 | 0.10 | 0.10 | 0.10 | 0.10 | 0.10 | 0.10 | 0.10 |
| Photoinitiator | DTS-102 (Midori Kagaku Co., Ltd.) | 3.0 | 2.5 | 2.5 | 2.5 | 3.0 | 2.5 | 2.5 | 2.5 | 2.5 |
| Anthracene derivative exemplified compound | A-3 | 1.0 | 1.0 | 1.0 | 1.0 | 1.0 | 1.0 | 1.0 | 1.0 | 1.0 |

TABLE 13

Ink Set 5 (inventive)
Viscosity of Each Color 33-36 mPa·s (25° C.)

|  |  | K | C | M | Y | W | Lk | Lc | Lm | Ly |
|---|---|---|---|---|---|---|---|---|---|---|
|  |  |  |  |  |  |  |  | Content (% by mass) | | |
| Pigment species |  | 2 | 3 | 5 | 4 | 6 | 2 | 3 | 5 | 4 |
| Pigment dispersion |  | 12.5 | 12.5 | 21.0 | 15.0 | 40.0 | 3.1 | 3.1 | 5.3 | 3.8 |
| Urethane polymer exemplified compound | E | 10.0 | 10.0 | 7.5 | 10.0 | 5.0 | 10.0 | 10.0 | 10.0 | 10.0 |
| Polymerizable compound (alicyclic epoxy compound, bifunctional) | EP-1 | 20.0 | 20.0 | 20.0 | 20.0 | 15.0 | 25.0 | 25.0 | 25.0 | 25.0 |
| Polymerizable compound (oxetane compound, bifunctional) | OXT-221 (Toagosei Co., Ltd.) | 33.3 | 33.8 | 27.8 | 31.3 | 25.8 | 38.2 | 38.2 | 36.1 | 37.6 |
| Polymerizable compound (oxetane compound, monofunctional) | OXT-213 (Toagosei Co., Ltd.) | 20.0 | 20.0 | 20.0 | 20.0 | 10.0 | 20.0 | 20.0 | 20.0 | 20.0 |
| Basic compound | KILESCOAT ZB (Chelest Corp.) | 0.10 | 0.10 | 0.10 | 0.10 | 0.10 | 0.10 | 0.10 | 0.10 | 0.10 |
| Surfactant | KF-352 (Shin-Etsu Silicones Co.) | 0.10 | 0.10 | 0.10 | 0.10 | 0.10 | 0.10 | 0.10 | 0.10 | 0.10 |
| Photoinitiator | DTS-102 (Midori Kagaku Co., Ltd.) | 3.0 | 2.5 | 2.5 | 2.5 | 3.0 | 2.5 | 2.5 | 2.5 | 2.5 |
| Anthracene derivative exemplified compound | A-22 | 1.0 | 1.0 | 1.0 | 1.0 | 1.0 | 1.0 | 1.0 | 1.0 | 1.0 |

TABLE 14

Ink Set 6 (inventive)
Viscosity of Each Color 40-43 mPa·s (25° C.)

| | | \multicolumn{9}{c}{Content (% by mass)} | | | | | | | | |
|---|---|---|---|---|---|---|---|---|---|---|
| | | K | C | M | Y | W | Lk | Lc | Lm | Ly |
| Pigment species | | 2 | 3 | 5 | 4 | 6 | 2 | 3 | 5 | 4 |
| Pigment dispersion | | 12.5 | 12.5 | 21.0 | 15.0 | 40.0 | 3.1 | 3.1 | 5.3 | 3.8 |
| Urethane polymer exemplified compound | F | 5.0 | 5.0 | 3.0 | 3.0 | 3.0 | 5.0 | 5.0 | 5.0 | 5.0 |
| Polymerizable compound (alicyclic epoxy compound, bifunctional) | EP-1 | 20.0 | 20.0 | 20.0 | 20.0 | 15.0 | 25.0 | 25.0 | 25.0 | 25.0 |
| Polymerizable compound (oxetane compound, bifunctional) | OXT-221 (Toagosei Co., Ltd.) | 40.3 | 40.8 | 34.3 | 40.3 | 27.8 | 43.2 | 43.2 | 41.1 | 42.6 |
| Polymerizable compound (oxetane compound, monofunctional) | OXT-213 (Toagosei Co., Ltd.) | 18.0 | 18.0 | 18.0 | 18.0 | 10.0 | 20.0 | 20.0 | 20.0 | 20.0 |
| Basic compound | KILESCOAT ZB (Chelest Corp.) | 0.10 | 0.10 | 0.10 | 0.10 | 0.10 | 0.10 | 0.10 | 0.10 | 0.10 |
| Surfactant | KF-352 (Shin-Etsu Silicones Co.) | 0.10 | 0.10 | 0.10 | 0.10 | 0.10 | 0.10 | 0.10 | 0.10 | 0.10 |
| Photoinitiator | DTS-102 (Midori Kagaku Co., Ltd.) | 3.0 | 2.5 | 2.5 | 2.5 | 3.0 | 2.5 | 2.5 | 2.5 | 2.5 |
| Anthracene derivative exemplified compound | A-33 | 1.0 | 1.0 | 1.0 | 1.0 | 1.0 | 1.0 | 1.0 | 1.0 | 1.0 |

TABLE 15

Ink Set 7 (inventive)
Viscosity of Each Color 28-32 mPa·s (25° C.)

| | | \multicolumn{9}{c}{Content (% by mass)} | | | | | | | | |
|---|---|---|---|---|---|---|---|---|---|---|
| | | K | C | M | Y | W | Lk | Lc | Lm | Ly |
| Pigment species | | 2 | 3 | 5 | 4 | 6 | 2 | 3 | 5 | 4 |
| Pigment dispersion | | 12.5 | 12.5 | 21.0 | 15.0 | 40.0 | 3.1 | 3.1 | 5.3 | 3.8 |
| Urethane polymer exemplified compound | B | 7.5 | 7.5 | 5.0 | 5.0 | 3.0 | 7.5 | 7.5 | 7.5 | 7.5 |
| Polymerizable compound (alicyclic epoxy compound, bifunctional) | Celoxide 2021P (Dicel Chemical Industries, Ltd.) | 20.0 | 20.0 | 20.0 | 20.0 | 15.0 | 25.0 | 25.0 | 25.0 | 25.0 |
| Polymerizable compound (vinyl ether compound) | CHVE (ISP Japan Ltd.) | 30.9 | 31.4 | 25.4 | 31.4 | 12.9 | 35.8 | 35.8 | 33.7 | 35.2 |
| Polymerizable compound (vinyl ether compound) | DVE-3 (ISP Japan Ltd.) | 10.0 | 10.0 | 10.0 | 10.0 | 10.0 | 10.0 | 10.0 | 10.0 | 10.0 |
| Polymerizable compound (monofunctional epoxy compound) | AOEX68 (Dicel Chemical Industries, Ltd.) | 15.0 | 15.0 | 15.0 | 15.0 | 15.0 | 15.0 | 15.0 | 15.0 | 15.0 |
| Surfactant | KF-352 (Shin-Etsu Silicones Co.) | 0.10 | 0.10 | 0.10 | 0.10 | 0.10 | 0.10 | 0.10 | 0.10 | 0.10 |
| Photoinitiator | DTS-102 (Midori Kagaku Co., Ltd.) | 3.0 | 2.5 | 2.5 | 2.5 | 3.0 | 2.5 | 2.5 | 2.5 | 2.5 |
| Anthracene derivative exemplified compound | A-6 | 1.0 | 1.0 | 1.0 | 1.0 | 1.0 | 1.0 | 1.0 | 1.0 | 1.0 |

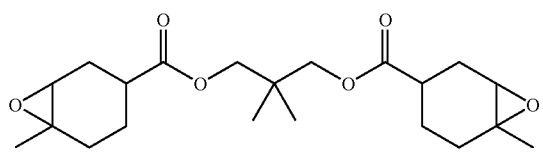

Compound EP-1

<<Ink-Jet Image Forming Method>>

[Pretreatment of Active Ray-Curable Inks]

Each of the active ray-curable inks stored in a sealed container was allowed to stand alternately at 50° C. and −20° C. for 24 hours each, and also stored for a total of 1 month. Using each of the thus-produced samples, image formation was carried out as follows.

[Image Formation]

Each of untreated ink sets 1-7 prepared above and above-pretreated ink sets 1-7 was mounted on an ink-jet recording apparatus employing the constitution described in FIG. 1 provided with piezo-type ink-jet nozzles. Then, Images 1-42 were formed on each recording medium of a width of 600 mm and a length of 500 m listed in Table 16 via continuous recording of the following image. As the image date, "highly detailed color digital standard image data 'N5 Bicycle' (published by Japanese Standards Association, December 1995)" was used. The ink feeding system was composed of an ink tank, a feeding pipe, a pre-chamber ink tank immediately before the head, a filter-provided piping arrangement, and a piezo head. Thermal insulation was provided from the prechamber tank to the head section and heating was carried out at 50° C. The piezo head was driven to eject multi-size dots of 2-15 pl at a resolution of 720×720 dpi (dpi represents the number of dots per 2.54 cm), and continuously ejected each of the active ray-curable inks of the individual colors constituting each ink set.

After deposition, curing was carried out instantaneously (less than 2 seconds after deposition) using the lamp units on both sides of the carriage. After recording, the total film thickness measured ranged from 2.3-20 μm. Herein, ink-jet image formation was performed based on the above method under an ambience of 25° C. and 50% RH. The following irradiation conditions were employed: using an irradiation source, high pressure mercury lamp VZero085 (produced by Integration Technology Inc.), and UVPF-A1 (produced by Iwasaki Electric Co., Ltd.), illuminance at 254 nm was measured for the illuminance and the peak wavelength on the recording medium; irradiation timing was 0.1 second after deposition; and a method for irradiation (area) was performed at both end portions of the recording head at 400 nW/cm².

TABLE 16

| Sample No. | Ink | Storage | Recording Medium | Remarks |
|---|---|---|---|---|
| 1 | ink composition 1 | without storage (evaluated immediate after liquid preparation) | PET | comparative |
| 2 | | | PVC | comparative |
| 3 | | | polyester fiber | comparative |
| 4 | | −20° C., 50° C. | PET | comparative |
| 5 | | 1 month | PVC | comparative |
| 6 | | | polyester fiber | comparative |
| 7 | ink composition 2 | without storage (evaluated immediate after liquid preparation) | PET | comparative |
| 8 | | | PVC | comparative |
| 9 | | | polyester fiber | comparative |
| 10 | | −20° C., 50° C. | PET | comparative |
| 11 | | 1 month | PVC | comparative |
| 12 | | | polyester fiber | comparative |
| 13 | ink composition 3 | without storage (evaluated immediate after liquid preparation) | PET | inventive |
| 14 | | | PVC | inventive |
| 15 | | | polyester fiber | inventive |
| 16 | | −20° C., 50° C. | PET | inventive |
| 17 | | 1 month | PVC | inventive |
| 18 | | | polyester fiber | inventive |
| 19 | ink composition 4 | without storage (evaluated immediate after liquid preparation) | PET | inventive |
| 20 | | | PVC | inventive |
| 21 | | | polyester fiber | inventive |
| 22 | | −20° C., 50° C. | PET | inventive |
| 23 | | 1 month | PVC | inventive |
| 24 | | | polyester fiber | inventive |
| 25 | ink composition 5 | without storage (evaluated immediate after liquid preparation) | PET | inventive |
| 26 | | | PVC | inventive |
| 27 | | | polyester fiber | inventive |
| 28 | | −20° C., 50° C. | PET | inventive |
| 29 | | 1 month | PVC | inventive |
| 30 | | | polyester fiber | inventive |
| 31 | ink composition 6 | without storage (evaluated immediate after liquid preparation) | PET | inventive |
| 32 | | | PVC | inventive |
| 33 | | | polyester fiber | inventive |
| 34 | | −20° C., 50° C. | PET | inventive |
| 35 | | 1 month | PVC | inventive |
| 36 | | | polyester fiber | inventive |

TABLE 16-continued

| Sample No. | Ink | Storage | Recording Medium | Remarks |
|---|---|---|---|---|
| 37 | ink composition 7 | without storage (evaluated immediate after liquid preparation) | PET | inventive |
| 38 | | | PVC | inventive |
| 39 | | | polyester fiber | inventive |
| 40 | | −20° C., 50° C. | PET | inventive |
| 41 | | 1 month | PVC | inventive |
| 42 | | | Polyester fiber | inventive |

PET: poly ethylene terephthalate(surface-untreated article)
PVC: poly vinyl chloride(surface-untreated article)
polyester fiber (TREVIRA CS, produced by Hoechst AG)

<<Evaluation of Ink-Jet Recording Images>>

Images 1-42 recorded via the above image forming method were evaluated at the time of 10 m output for each of the evaluations described below.

[Evaluation of Color Mixing (Bleeding or Wrinkling)]

With regard to the level in use of PET as a recording medium, printing was carried out so that each 1 dot of the colors of Y, M, C, and K was arranged adjacent to one another, and the individual color dots adjacent to one another were magnified with a magnifying glass for visual observation of the magnitude of bleeding. Color mixing was evaluated based on the following criteria.

A: Adjacent dot shapes remain perfectly circular with no bleeding.

B: Adjacent dot shapes remain almost perfectly circular with almost no bleeding.

C: Dot shapes are slightly deformed due to slight bleeding of adjacent dots, however, resulting in a minimum level of use.

D: Adjacent dots are mixed by bleeding and wrinkles are generated in superimposed portions, resulting in uselessness.

[Physical Properties Evaluation of Ink Cured Films]

Sampled was an area of 10 cm² of an ink cured film (a portion of a thickness 20 m) at the time of 10 m output of the image obtained via the above image forming method. Then, the following cured film physical properties were evaluated.

(Cured Material Evaluation Method)

A) Images Recorded on PET or PVC as a Recording Medium

<Pencil Scratch Test>

In the same manner as described in Example 1, hardness of each cured material was determined via a method in conformity with the pencil scratch test (JIS K 5400).

B) Images Recorded on PVC or Polyester as a Recording Medium

<Substrate Adhesion Evaluation>

In the same manner as described in Example 1, substrate adhesion was evaluated via a cross-cut tape-peeling residual adhesion ratio test in conformity with JIS K 5400.

<Flexibility Evaluation of Cured Films>

In the same manner as described in Example 1, flexibility of cured films was evaluated.

The results obtained above are shown in Table 17.

TABLE 17

| Sample No. | *1 | Cured Film Hardness | Substrate Adhesion (%) | Flexibility | Remarks |
|---|---|---|---|---|---|
| 1 | D | 4B | — | — | comparative |
| 2 | — | 3B | 75 | D | comparative |
| 3 | — | — | 80 | D | comparative |
| 4 | D | 4B | — | — | comparative |

TABLE 17-continued

| Sample No. | *1 | Cured Film Hardness | Substrate Adhesion (%) | Flexibility | Remarks |
|---|---|---|---|---|---|
| 5 | — | 3B | 60 | D | comparative |
| 6 | — | — | 60 | D | comparative |
| 7 | B | 3H | — | — | comparative |
| 8 | — | 2H | 55 | C | comparative |
| 9 | — | — | 50 | B | comparative |
| 10 | D | B | — | — | comparative |
| 11 | — | B | 35 | C | comparative |
| 12 | — | — | 30 | C | comparative |
| 13 | B | 3H | — | — | inventive |
| 14 | — | 2H | 80 | B | inventive |
| 15 | — | — | 80 | B | inventive |
| 16 | B | 3H | — | — | inventive |
| 17 | — | 2H | 80 | B | inventive |
| 18 | — | — | 80 | B | inventive |
| 19 | A | 4H | — | — | inventive |
| 20 | — | 4H | 75 | A | inventive |
| 21 | — | — | 70 | A | inventive |
| 22 | A | 3H | — | — | inventive |
| 23 | — | 3H | 70 | A | inventive |
| 24 | — | — | 70 | A | inventive |
| 25 | A | 4H | — | — | inventive |
| 26 | — | 4H | 85 | A | inventive |
| 27 | — | — | 80 | A | inventive |
| 28 | A | 3H | — | — | inventive |
| 29 | — | 3H | 85 | A | inventive |
| 30 | — | — | 80 | A | inventive |
| 31 | A | 3H | — | — | inventive |
| 32 | — | 2H | 70 | B | inventive |
| 33 | — | — | 70 | B | inventive |
| 34 | B | 2H | — | — | inventive |
| 35 | — | 2H | 60 | B | inventive |
| 36 | — | — | 60 | B | inventive |
| 37 | A | 3H | — | — | inventive |
| 38 | — | 2H | 65 | B | inventive |
| 39 | — | — | 55 | B | inventive |
| 40 | B | 3H | — | — | inventive |
| 41 | — | 2H | 65 | C | inventive |
| 42 | — | — | 55 | B | inventive |

*1: Color Mixing Resistance (Bleeding, Wrinkling)

The results described in Table 17 clearly show that any cured film formed using an ink set composed of active ray-curable inks employing the constitution specified by the present invention exhibits excellent properties with respect to each of hardness, substrate adhesion, and flexibility.

Further, the same evaluations were carried out using ink sets 1-7 as described above by use of a line head recording-type ink-jet recording apparatus shown in FIG. 2 as an ink-jet recording apparatus. The results confirmed that the same results as shown in Table 17 were obtained.

What is claimed is:

1. An active ray-curable inkjet ink comprising a pigment, a photoinitiator, a polymerizable compound, a compound represented by Formula (1), and a urethane polymer or a urethane oligomer having no photopolymerizable group in a molecule:

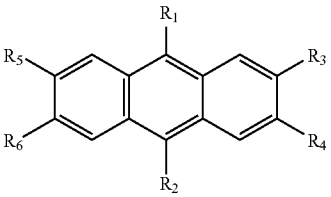

Formula (1)

wherein at least either of $R_1$ and $R_2$ represents an alkoxy group having a carbon number of 4-10; and at least one of $R_3$, $R_4$, $R_5$, and $R_6$ represents an alkyl group, an alkylsulfonyl group, or an alkoxy group; each group having a carbon number of 4-9 and having a secondary or tertiary carbon atom at a binding site to the anthracene ring.

2. The active ray-curable ink described in claim 1, wherein a weight average molecular weight of the urethane polymer or the urethane oligomer is 600-10000.

3. The active ray-curable ink described in claim 1 containing the urethane polymer or the urethane oligomer at a ratio of 1.0%-20% by mass based on the total weight of the ink.

4. The active ray-curable ink described in claim 1 containing a monofunctional monomer as the polymerizable compound at a ratio of 10%-30% by mass based on the total weight of the ink.

5. The active ray-curable ink described in claim 4, wherein the monofunctional monomer is at least one type of compound selected from an epoxy compound, a vinyl ether compound, and an oxetane compound.

6. The active ray-curable ink described in claim 1 containing a modified silicone oil.

7. The active ray-curable ink described in claim 1 having a viscosity of 7-100 mPa·s at 25° C.

8. A method for forming an image comprising the step of:
ejecting an active ray-curable ink described in claim 1 onto a recording medium from an ink-jet recording head, wherein the recording medium is a fibrous material.

* * * * *